United States Patent [19]

Shiozawa

[11] Patent Number: 5,478,598
[45] Date of Patent: Dec. 26, 1995

[54] WOOD PRESERVATIVE COMPOSITION, PROCESS FOR TREATING WOOD WITH THE SAME, WOOD TREATED WITH THE SAME

[75] Inventor: Kazunobu Shiozawa, Osaka, Japan

[73] Assignee: Kabushiki Kaisha Koshii Preserving, Osaka, Japan

[21] Appl. No.: 280,026

[22] Filed: Jul. 25, 1994

[30] Foreign Application Priority Data

Jul. 28, 1993 [JP] Japan .................... 5-186249

[51] Int. Cl.⁶ .................... B05D 3/00; B27K 3/02; B27K 3/52
[52] U.S. Cl. .................... 427/297; 106/15.05; 106/18.3; 106/18.32; 106/18.35; 106/18.36; 427/440
[58] Field of Search .................... 106/15.05, 18.3, 106/18.32, 18.35, 18.36; 424/630, 632, 637, 638, 641, 658, 659, 660; 514/494; 252/384, 385; 427/440, 297

[56] References Cited

U.S. PATENT DOCUMENTS

| | | | |
|---|---|---|---|
| 1,339,488 | 5/1920 | Weiss | 427/297 |
| 3,306,765 | 2/1967 | Du Fresne et al. | 428/541 |
| 3,974,318 | 8/1976 | Lilla | 428/260 |
| 4,313,976 | 2/1982 | Leach | 106/18.36 |
| 4,622,248 | 11/1986 | Leach et al. | 106/18.36 |
| 4,732,817 | 3/1988 | Lotz et al. | 106/18.36 |
| 4,737,491 | 4/1988 | Leppavuori et al. | 106/18.36 |
| 4,871,473 | 10/1989 | Goettsche et al. | 106/18.36 |
| 4,973,501 | 11/1990 | Gradeff | 427/440 |
| 5,207,823 | 5/1993 | Shiozawa | 106/18.36 |

FOREIGN PATENT DOCUMENTS

| | | |
|---|---|---|
| 0450568 | 10/1991 | European Pat. Off. . |
| 3520313 | 1/1986 | Germany . |
| 8176 | of 1909 | United Kingdom . |
| 139974 | 4/1920 | United Kingdom . |

OTHER PUBLICATIONS

Database WPI Section Ch, Week 8042, Derwent Publications Ltd., London, GB; Class E05, AN 80–74945/C42 & SU–A–719 869 (Woodwork Ind Res) 8 Mar. 1980.

*Primary Examiner*—Anthony Green
*Attorney, Agent, or Firm*—Jordan and Hamburg

[57] ABSTRACT

A wood preservative composition includes a first solution having: a copper compound selected from the group consisting of copper borate, copper hydroxide, copper acetate, copper chloride, and copper sulfate; a zinc compound selected from the group consisting of zinc borate, zinc acetate, zinc hydroxide, zinc oxide, zinc chloride, and zinc sulfate; and/or a boron compound selected from the group consisting of boric acid and borax; sodium silicate, and a second solution having rare earth chloride or alkaline earth chloride.

12 Claims, 2 Drawing Sheets

WOOD PRESERVATIVE COMPOSITION, PROCESS FOR TREATING WOOD WITH THE SAME, WOOD TREATED WITH THE SAME

BACKGROUND OF THE INVENTION

This invention relates to a wood preservative composition having an improved fixing ability in wood, process for treating wood with such wood preservative composition, and wood treated with such wood preservative composition.

It has been conventionally known that compositions containing a specified kind of metal compound or inorganic compound as a main component effectively serve as a wood preservative composition.

Metal compounds of these compositions include copper compounds such as copper acetate, chromium compounds such as copper chromate, potassium chromate, and sodium dichromate, and mercury compounds such as mercuric chloride.

Inorganic compounds of these compositions include arsenic compounds such as arsenious acid, fluorine compounds such as sodium fluoride, boron compounds such as boric acid and borax.

These compounds are mixed in a desired combination to obtain a wood preservative composition in the form of an aqueous solution. A fixing agent such as acetic acid and ammonia is often added to such an aqueous solution.

Then obtained composition is impregnated into wood to produce wood capable of preventing wood-attacking organisms from growing therein. These compositions originally have a wood preserving effect. The composition impregnated into wood is fixed in the wood through chemical reactions which take place between preservative components and between a preservative component and the wood. However, most of these compositions are poorly fixed in the wood and cannot maintain the wood preserving effect over a long period of time.

These compositions have other problems, too. For example, some of the components of these compositions, such as arsenic compounds, are fatally toxic and heavy metal compounds, such as chromium compounds and mercury compounds are considerably toxic. Accordingly, it is necessary to carefully handle these compositions when they are impregnated into wood so as not to risk workers' health, let alone to carefully prepare them. It is also necessary to carefully discard unnecessary pieces of wood treated with such a composition, which pieces are inevitably produced when the wood is cut into a desired form, and old wood products to prevent environmental pollution.

Reflecting the above problems, in recent years, attention has been turned to the use of an aqueous solution, as a wood preservative composition, containing as a main component copper borate or zinc borate in place of chromium compounds and arsenic compounds, and a volatile basic compounds. In these compositions, it has been known that the copper component has primarily a fungi resisting effect; the zinc component has primarily a fungi resisting effect and secondary insect resisting effect; and the boric acid component has primarily an insect resisting effect. Since neither chromium compounds nor arsenic compounds are used, these compositions have the advantage of having a low toxicity.

However, normally, compositions containing a boron compound as a main component cannot be fixed in the wood satisfactorily. It is said that, when the wood impregnated with such a composition is buried in the earth, 75 percent or more of the boric acid component of the boron compound will leach out in about two years.

SUMMARY OF THE INVENTION

It is an object of the invention to provide a wood preservative composition which can fix preserving effective components in wood for a longer period of time of period.

It is another object of the invention to provide a process for treating wood which enables preserving effective components to be fixed in wood for a longer period of time.

It is another object of the invention to provide a wood which can hold preserving effective components for a longer time.

Accordingly, the invention is directed to a wood preservative composition comprising: a preservative component selected from the group consisting of copper compound, zinc compound, boron compound, and mixtures thereof; a volatile basic compound; and water.

Further, it may be preferable to add sodium silicate in the composition.

Further, the wood preservative composition is additionally provided with an aqueous solution including a neutral salt.

The copper compound may be selected from the group consisting of copper borate, cuprous hydroxide, cupric hydroxide, cupric acetate, cupric chloride, and copper sulfate. The copper borate may be selected from the group consisting of copper tetraborate, copper tetraborate monobasic, copper tetraborate dibasic, and copper tetraborate tribasic.

The zinc compound may be selected from the group consisting of zinc borate, zinc acetate, zinc hydroxide, zinc oxide, and zinc chloride. The zinc borate may be selected from the group consisting of zinc tetraborate dibasic, tetra zinc hydroxide tri(tetraboric acid) salt, and zinc hydroxide dimetaboric acid salt.

The boron compound may be selected from the group consisting of boric acid and borax.

The volatile basic compound may be one having the formula $R_3N$, wherein R is selected from the group consisting of a hydrogen atom and a low alkyl group.

The neutral salt may be selected from the group consisting of rare earth chloride and alkaline earth salt. The rare earth chloride may be selected from the group consisting of scandium chloride, yttrium chloride, and lanthanoid chloride. The alkaline earth salt may be selected from the group consisting of calcium chloride, magnesium chloride, barium chloride, strontium chloride, and magnesium sulfate.

Also, the present invention is directed to a wood treating process comprising the steps of: impregnating wood with a first solution including: a preservative component selected from the group consisting of copper compound, zinc compound, boron compound, and mixtures thereof; a volatile basic compound; a sodium silicate; and water; or impregnating the wood impregnated with the first solution with a second solution including a neutral salt.

Further, the present invention is directed to a wood being treated by being impregnated with a first solution including: a preservative component selected from the group consisting of copper compound, zinc compound, boron compound, and mixtures thereof; a volatile basic compound; a sodium silicate; and water; or being further impregnated with a second solution including a neutral salt.

The inventive composition containing a preservative component of copper compound, zinc compound, or boron compound has a low toxicity to a human body and a satisfactory wood preserving action. The impregnation of these components into wood gives the wood a wood preserving function, with the result that the wood is effectively prevented from decomposing and being damaged from noxious insects.

These components are dissolved in the volatile basic aqueous solution, and water insoluble boric acid, copper and/or zinc components having a large insect resisting effect fix more stably in the wood when the basic component flows in the wood impregnated with these components.

Further, sodium silicate which is a component of the inventive composition enters smaller ducts in the wood and becomes a colloidal gel, thereby closing up these tiny ducts. Thus, boric acid, copper and/or zinc components impregnated into the wood are confined in the wood. When sodium silicate is made water insoluble during the second treatment, the leaching of these components out of the wood can be effectively prevented.

According to the inventive process, the wood impregnated with the inventive composition is further impregnated with the aqueous solution containing the rare earth and/or alkaline earth compounds. Thus, sodium silicate in the inventive composition reacts in the presence of these compounds and becomes water a insoluble rare earth silicate, closing up tiny ducts in the wood. As a result, the inventive composition can be retained in the wood while the leaching thereof out of the wood being prevented.

In the inventive wood, the effective components are fixed in the wood by being blocked up by rare earth silicate and alkaline earth silicate. Therefore, even if this wood is exposed in the air or buried in the earth over a long term, the composition is confined by the rare earth silicate and alkaline earth silicate and is unlikely to be leached out of the wood. Thus, the wood impregnated with the composition can be preserved over a long term.

These and other objects, features and advantages of the present invention will become more apparent upon a reading of the following detailed description and accompanying drawings.

DETAILED DESCRIPTION OF THE PREFERRED EMBODIMENTS OF THE INVENTION

Wood preservative compositions of the present invention are produced by dissolving the following preservative component or mixture and sodium silicate in a basic aqueous solution.

1) A copper compound;
2) A zinc compound;
3) A boron compound; and
4) A mixture of a copper compound, zinc compound, and/or boron compound.

These preservative components and mixtures have a low toxicity while having an excellent wood preserving action, unlike conventionally used arsenic compounds and heavy metal compounds such as chromium compounds and mercury compounds.

Specifically, the following copper compounds can be used for the wood preservative compositions of the present invention:

Copper tetraborate ($CuB_4O_7$);
Copper tetraborate monobasic ($Cu(OH)_2.CuB_4O_7$);
Copper tetraborate dibasic ($2Cu(OH)_2.CuB_4O_7$);
Copper tetraborate tribasic ($3Cu(OH)_2.CuB_4O_7$);
Cuprous hydroxide ($Cu(OH)$);
Cupric hydroxide ($Cu(OH)_2$);
Cupric acetate ($(CH_3COO)_2Cu$);
Basic copper carbonate ($Cu(OH)_2.CuCO_3$);
Cupric chloride ($CuCl_2$); and
Copper sulfate ($CuSO_4$).

The following zinc compounds can be used:

Zinc tetraborate ($ZnB_4O_7$);
Zinc tetraborate dibasic ($2Zn(OH)_2.ZnB_4O_7$);
Tetra zinc hydroxide tri(tetraboric acid) salt ($4Zn(OH)_2.3H_2B_4O_7$);
Zinc hydroxide dimetaboric acid salt ($Zn(OH)_2.(2HBO_2)$);
Zinc acetate ($(CH_3COO)_2Zn$);
Zinc hydroxide ($Zn(OH)_2$);
Zinc oxide ($ZnO$);
Zinc chloride ($ZnCl_2$); and
Zinc sulfate ($ZnSO_4$).

The following boron compounds can be used:

Boric acid ($H_3BO_3$); and
Borax ($Na_2B_4O_7.10H_2O$).

The copper tetraborate monobasic ($Cu(OH)_2.CuB_4O_7$) is produced by allowing borax to react with copper sulfate. Specifically, when copper sulfate and borax are allowed to react, they undergo a reaction as defined in the following reaction formula (1), thereby producing copper tetraborate $CuB_4O_7$:

$$CuSO_4.5H_2O+Na_2B_4O_7.10H_2O \rightarrow CuB_4O_7+Na_2SO_4+15H_2O \quad (1)$$

The resulting copper tetraborate is caused to undergo hydrolysis as shown in the following reaction formula (2) by being repeatedly washed with water, with the result that the copper tetraborate monobasic ($Cu(OH)_2.CuB_4O_7$) can be obtained.

$$2.CuB_4O_7+7H_2O \rightarrow (CuOH)_2.B_4O_7+4H_3BO_3 \rightarrow Cu(OH)_2.CuB_4O_7+4H_3BO_3 \quad (2)$$

The copper tetraborate dibasic ($2Cu(OH)_2.CuB_4O_7$) can be produced by allowing a borax solution of high concentration to react with copper sulfate at about 50° C. Specifically, when copper sulfate and the borax solution of high concentration are allowed to react at about 50° C. copper tetraborate ($CuB_4O_7$) is produced as shown in the reaction formula (1) and is immediately hydrolyzed as shown in the following reaction formula (3) with the result that the copper tetraborate dibasic ($2Cu(OH)_2.CuB_4O_7$) is obtained.

$$3.CuB_4O_7+14H_2O \rightarrow (CuOH)_3.B_4O_7(OH)+2H_2B_4O_7+10H_2O \rightarrow$$

$$\{2Cu(OH)_2\}.CuB_4O_7+8H_3BO_3 \quad (3)$$

A specific example of production is as follows. 125 parts by weight of 40 percent solution (50° C.) of pentahydrated copper sulfate was added to 763 parts by weight of 10 percent solution (50° C.) of decahydrated borax with stirring. The obtained mixture solution was kept at 50° C. for 1 hour, and then kept at 20° to 30° C. for 24 hours, which resulted in precipitation. The obtained precipitate was washed with water repeatedly until unreacted borax was completely removed, and dried until a constant weight was reached. Consequently, 26.81 g of copper tetraborate dibasic was obtained.

The copper tetraborate tribasic ($3Cu(OH)_2.CuB_4O_7$) can be obtained by adding equimolecular quantities of copper sulfate and borax solution of high concentration in a large quantity of water heated at about 60° C. Firstly, copper tetraborate $CuB_4O_7$) is produced as shown in the reaction formula (1), and is immediately hydrolyzed to produce the copper tetraborate tribasic ($3Cu(OH)_2.CuB_4O_7$) as shown in the following formula (4).

$$4CuB_4O_7+21H_2O \rightarrow (CuOH)_4.B_4O_7(OH)_2+3H_2B_4O_7+15H_2O \rightarrow \\ \{3Cu(OH)_2\}.CuB_4O_7+12H_3BO_3 \quad (4)$$

A specific example of production is as follows, 125 parts by weight of 40 percent solution of pentahydrated copper sulfate (60° C.) and 750 parts by weight of 10.2 percent solution (60° C.) of decahydrated borax were equimolecularly added 100 parts by weight of water (60° C.) with stirring. This mixture solution was kept at 60° C. for 1 hour, and then kept at 20° to 30° C. for 24 hours, which resulted in precipitation. The obtained precipitate was washed with water until unreacted borax was completely removed, and dried at 60° C. for 48 hours. Consequently, 24.3 g of copper tetraborate tribasic was obtained.

The cuprous hydroxide (Cu(OH)) is produced in a saline solution when the saline solution is electrolyzed using a copper electrode. It is also possible to obtain the cuprous hydroxide as a yellow precipitate by adding alkali hydroxide to cuprous salts.

The cupric hydroxide ($Cu(OH)_2$) is produced in the form of blue crystals by dissolving cuptic sulfate in aqueous ammonia and adding sodium hydroxide thereto.

The zinc tetraborate dibasic ($2Zn(OH)_2.ZnB_4O_7$) is produced by allowing borax to react with zinc chloride. This reaction can be expressed by the following reaction formulas (5) and (6).

$$ZnCl_2+Na_2B_4O_7.10H_2O \rightarrow ZnB_4O_7+2NaCl+10H_2O \quad (5)$$

$$6ZnB_4O_7+28H_2O \rightarrow 2\{(Zn(OH)_3.B_4O_7(OH)\}+16H_3BO_3 \\ \rightarrow 2[\{2Zn(OH)_2\}.ZnB_4O_7]+16H_3BO_3 \quad (6)$$

For example, 381.5 parts of 2 percent solution of decahydrated borax was added to 27.3 parts of 10 percent solution of zinc chloride with stirring a normal temperature, thereby obtaining a white precipitate. This precipitate was repeatedly washed with water until unreacted borax was completely removed, and dried at 40° C. for 24 hours or longer until a constant weight was reached. Consequently, 2.90 g of zinc tetraborate dibasic was obtained.

When being dissolved in water in the presence of a volatile basic compound, zinc tetraborate dibasic is hydrolyzed to produce zinc tetraborate pentabasic ($\{5Zn(OH)_2\}.ZnB_4O_7$) as shown in the following reaction formula (7).

$$2[\{2Zn(OH)_2\}.ZnB_4O_7]+7H_2O \rightarrow (ZnOH)_6.B_4O_7(OH)_4+4H_3BO_3 \rightarrow$$

$$\{5Zn(OH)_2\}.ZnB_4O_7+4H_3BO_3 \quad (7)$$

The tetra zinc hydroxide tri(tetraboric acid) salt ($4Zn(OH)_2.3H_2B_4O_7$) is produced and sold in the product name of "Zinc Borate 2335" by Tomita Seiyaku Kabushiki Kaisha, a Japanese chemical company. When being dissolved in water the presence of a volatile basic compound, this tetra zinc hydroxide tri(tetraboric acid) salt is hydrolyzed to produce tetra zinc hydroxide di(tetraboric acid) salt ($4Zn(OH_2).2H_2B_4O_7$) as shown in the following reaction formula (8).

$$4Zn(OH)_2.3H_2B_4O_7+5H_2O \rightarrow 4Zn(OH)_2.2H_2B_4O_7+4H_3BO_3 \quad (8)$$

Further, the zinc hydroxide dimetaboric acid salt ($Zn(OH)_2.2HBO_2$) is sold under the product name of "Zinc Borate 101" by Tomita Seiyaku Kabushiki Kaisha. When being dissolved in water in the presence of a volatile basic compound. this zinc hydroxide dimetaboric acid salt is hydrolyzed to produce zinc hydroxide monometaboric acid salt ($Zn(OH)_2.HBO_2$) as shown in the following reaction formula (9).

$$Zn(OH)_2.2HBO_2+H_2O \rightarrow Zn(OH)_2.HBO_2+H_3BO_3 \quad (9)$$

Boric acid and borax are produced and sold by many chemical companies, and can be accordingly obtained easily in the usual market.

Copper components of the above products have a fungi resisting effect; Zinc components of the above products have fungi and insect resisting effects; and Boric acid components thereof have an insect resisting effect.

Inventive wood preservative compositions having an improved fixing ability are produced by adding sodium silicate to the above-mentioned preservative compounds or mixtures in the presence of a basic aqueous solution.

Sodium silicate is added for the following reason. When being dissolved in water, molecules of sodium silicate are assembled over time and colloidal gelation of the sodium silicate solution takes place. This invention makes use of this characteristic of sodium silicate. More specifically. as a result of vigorous research carried out by the inventors, it was found out that, when the above composition is impregnated in wood, sodium silicate closes up vessels, tracheids, and similar tiny ducts in the wood through its gelation, thereby confining preservative components, such as copper borate, zinc borate, and boric acid in the wood.

Aqueous ammonia obtained by dissolving ammonia which is a volatile basic compound in water is frequently used as the basic aqueous solution. However, the volatile basic compound is not limited to ammonia. Primary, secondary and tertiary amines having a boiling point of 100° C. or lower may also preferably be used as such. These amines include monomethylamine, dimethylamine, trimethylamine, monopropylamine, dipropylamine, tripropylamine, and monopentylamine.

The reason why the aqueous solution of the volatile basic compound is used is that the above-mentioned preservative components are exceedingly hard to dissolve in mere water, but dissolve well when the water is basic.

The reason for selecting a basic compound having a volatility is to improve the fixing ability of the wood preservative component after the impregnation into wood. For example, when aqueous ammonia is used as a basic aqueous solution, a reaction mechanism, in actuality, becomes more complicated. However, schematically speaking, since $NH_3$ flows rapidly from the inside to the outside of the wood after the composition, according to the invention, which is dissolved in the aqueous ammonia, is impregnated into the wood, the preservative component precipitates in the water and fixes in the wood. Upon precipitation, it is effectively prevented that the above-mentioned preservative component is leached out of the wood because it is hard to dissolve in water.

In the wood, the gelation of sodium silicate ($Na_2O \cdot n(SiO_2)$: where n=2 to 3) develops and closes up the tiny ducts in the wood while confining the preservative component therein. Thus, the preservative component having an effective preserving action is stably fixed in the wood. The pH of the basic aqueous solution is determined to be about 9 to 13.

The concentration of copper compounds is generally set at 0.1 to 10 weight percent. The following specific compounds are for the best result set as follows:

| Copper tetraborate, | 0.2 to 8.0 wt %: |
|---|---|
| Copper tetraborate tribasic, | 0.1 to 5.0 wt %; |
| Cupric hydroxide, | 0.1 to 5.0 wt %; |
| Basic copper carbonate, | 0.1 to 5.0 wt %; |
| Copper sulfate, | 0.3 to 6.0 wt %. |

The concentration of zinc compounds is generally set at 0.1 to 9.4 weight percent. The following specific compounds are for the best result set as follows:

| Tetra zinc hydroxide tri(tetraboric acid) salt, | 0.3 to 5.0 wt %; |
|---|---|
| Zinc oxide, | 0.2 to 5.0 wt %. |

The concentration of boron compounds is generally set at 0.1 to 5.0 weight percent, for the best result,

| Boric acid, | 0.1 to 3.0 wt %; |
|---|---|
| Borax, | 0.1 to 3.0 wt %. |

The concentration of sodium silicate is generally set at 0.1 to 50.0 weight percent, for the best result, 0.5 to 30.0 weight percent.

The range of the concentration of each component is determined as above for the following reasons. When the concentration of these components is lower than a lower limit of the range, an effective wood preserving action is not given to the wood impregnated with the components. On the contrary, when the concentration of these components is higher than an upper limit of the range, the composition discolors and blocks tissues on the surface of the wood, thereby making it difficult to effectively penetrate into inner tissues of the wood.

The following may be used as an additive. Water soluble alkyl ether and alkyl ester of bivalent aliphatic alcohol such as ethylene glycol, propylene glycol may be used as a penetrating agent. Besides ethylene glycol, etc., a variety of known surface-active agents may be used as a penetrating agent. Further, perfumes and dyes or like colorants may be added.

In impregnating the preservative composition into wood, an impregnation method is generally used according to which a wood is immersed in an aqueous solution of the composition and the solution is pressure-impregnated into the wood after pressure reduction. Specifically, respective components are mixed at a predetermined ratio to prepare a wood preservative composition, i.e., an aqueous solution to be impregnated. This solution is filled in a closable bath, which is closed after the wood to be treated is immersed. The pressure in the closed bath is reduced to 600 to 700 mmHg so as to remove air in the wood. Thereafter, the pressure is increased to normal level to cause the solution to penetrate into the wood.

The pressure in the bath may be increased to higher than the normal level when the solution is impregnated into the wood. In this case, the pressure in the bath is normally increased to 5 to 20 kg/cm$^2$G. The obtained wood is air-dried at normal temperature for several days, or forcibly dried at 50° to 60° C. to become a wood resistant to fungi and insects.

In order to keep the preserving effect of the treated wood over a long period of time, an aqueous solution containing a neutral salt such as rare earth chloride and alkaline earth chloride is impregnated into the wood already impregnated with the preservative composition including the above-mentioned preservative component(s) and sodium silicate.

When such neutral salt as rare earth chloride and alkaline earth chloride is impregnated into the wood, sodium silicate is allowed to penetrate into tinier ducts in the wood in the presence of these chlorides and becomes water insoluble calcium silicate, magnesium silicate, rare earth silicate, and the like through the reaction defined in the following reaction formulas (10) to (12), thereby closing up those tiny ducts. Thus, the preservative component(s) is sealably fixed in the wood.

$$Na_2O \cdot nSiO_2 + CaCl_2 \rightarrow 2NaCl + CaO \cdot nSiO_2 \quad (10)$$

$$Na_2O \cdot nSiO_2 + MgCl_2 \rightarrow 2NaCl + MgO \cdot nSiO_2 \quad (11)$$

$$6(Na_2O \cdot nSiO_2) + Ce_2Cl_3 \rightarrow 6NaCl + Ce_2O_3 \cdot 6nSiO_2 \quad (12)$$

Scandium chloride, yttrium chloride, lanthanoid chloride, etc. can be used as the above rare earth chlorides. Further, calcium chloride, magnesium chloride, barium chloride, strontium chloride, magnesium sulfate etc. can be used as the above alkaline earth salt.

The neutral salt is impregnated into the wood by immersing the wood already impregnated with the preservative component(s) and sodium silicate in the aqueous solution containing the neutral salt.

In this case, the concentration of the neutral salt in the aqueous solution is set at 1 to 50 weight percent, for the best result at 2° to 40° C. weight percent. This is because various research carried out thus far led to the following results. When this concentration is lower than a lower limit of the range, sodium silicate is gelatinized into water insoluble silicate with poor stability, thereby making it difficult to attain the high fixing ability. On the contrary, when this concentration is higher than an upper limit of the range, the neutral salt is not fully dissolved in the aqueous solution, thereby making the stability of the solution poor.

In the wood impregnated with the preservative composition obtained by dissolving the above-mentioned preservative component(s) and sodium silicate in the basic aqueous solution and the neutral salt, i.e., rare earth chloride or alkaline earth chloride or mixtures of these chlorides, ducts are closed up by the water insoluble silicate and preservative component(s) are securely fixed.

Next, the invention will be described with reference to the following EXAMPLES 1 to 25 which were produced. It should be noted that the concentration of each component in each EXAMPLE is indicated in the term of weight percent.

EXAMPLE 1

| | |
|---|---|
| Tetra zinc hydroxide, tri(tetraboric acid) salt | 0.80% |
| Basic copper carbonate | 0.30% |
| Aqueous ammonia (25%) | 2.30% |
| Ammonium chloride | 0.57% |
| Ethylenediamine | 1.22% |
| Water | 94.81% |

EXAMPLE 2

| | |
|---|---|
| Boric acid | 1.71% |
| Cupric hydroxide | 0.43% |
| Aqueous ammonia (25%) | 2.57% |
| Ammonium chloride | 0.38% |
| Water | 94.91% |

EXAMPLE 3

| | |
|---|---|
| Tetra zinc hydroxide, tri(tetraboric acid) salt | 0.80% |
| Cupric hydroxide | 0.34% |
| Aqueous sodium silicate (48%) | 13.28% |
| Aqueous ammonia (25%) | 3.27% |
| Ethylenediamine | 1.22% |
| Water | 81.09% |

EXAMPLE 4

| | |
|---|---|
| Copper tetraborate tribasic | 0.34% |
| Aqueous ammonia (25%) | 3.00% |
| Water | 96.66% |

EXAMPLE 5

| | |
|---|---|
| Tetra zinc hydroxide, tri(tetraboric acid) salt | 0.80% |
| Cupric hydroxide | 0.34% |
| Aqueous sodium silicate (48%) | 13.27% |
| Aqueous ammonia (25%) | 3.26% |
| Ethylenediamine | 1.22% |
| Water | 81.11% |

EXAMPLE 6

| | |
|---|---|
| Tetra zinc hydroxide, tri(tetraboric acid) salt | 0.80% |
| Cupric hydroxide | 0.34% |
| Aqueous sodium silicate (48%) | 13.27% |
| Aqueous ammonia (25%) | 3.26% |
| Ethylenediamine | 1.22% |
| Water | 81.11% |

EXAMPLE 7

| | |
|---|---|
| Tetra zinc hydroxide, tri(tetraboric acid) salt | 0.80% |
| Cupric hydroxide | 0.34% |
| Aqueous sodium silicate (48%) | 13.27% |
| Aqueous ammonia (25%) | 3.26% |
| Ethylenediamine | 1.22% |
| Water | 81.11% |

EXAMPLE 8

| | |
|---|---|
| Tetra zinc hydroxide, tri(tetraboric acid) salt | 0.80% |
| Cupric hydroxide | 0.34% |
| Aqueous sodium silicate (48%) | 13.27% |
| Aqueous ammonia (25%) | 3.26% |
| Ethylenediamine | 1.22% |
| Water | 81.11% |

EXAMPLE 9

| | |
|---|---|
| Tetra zinc hydroxide, tri(tetraboric acid) salt | 0.80% |
| Cupric hydroxide | 0.34% |
| Aqueous sodium silicate (48%) | 13.27% |
| Aqueous ammonia (25%) | 3.26% |
| Ethylenediamine | 1.22% |
| Water | 81.11% |

EXAMPLE 10

| | |
|---|---|
| Tetra zinc hydroxide, tri(tetraboric acid) salt | 0.80% |
| Cupric hydroxide | 0.34% |
| Aqueous sodium silicate (48%) | 13.27% |
| Aqueous ammonia (25%) | 3.26% |
| Ethylenediamine | 1.22% |
| Water | 81.11% |

EXAMPLE 11

| | |
|---|---|
| Tetra zinc hydroxide, tri(tetraboric acid) salt | 0.80% |
| Cupric hydroxide | 0.34% |
| Aqueous sodium silicate (48%) | 27.80% |
| Aqueous ammonia (25%) | 3.27% |
| Ethylenediamine | 1.22% |
| Water | 66.57% |

EXAMPLE 12

| | |
|---|---|
| Tetra zinc hydroxide, tri(tetraboric acid) salt | 0.80% |
| Cupric hydroxide | 0.34% |
| Aqueous sodium silicate (48%) | 13.27% |
| Aqueous ammonia (25%) | 3.26% |
| Ethylenediamine | 1.22% |

EXAMPLE 13

| | |
|---|---|
| Tetra zinc hydroxide, tri(tetraboric acid) salt | 0.80% |
| Cupric hydroxide | 0.34% |
| Aqueous sodium silicate (48%) | 13.27% |
| Aqueous ammonia (25%) | 3.26% |
| Ethylenediamine | 1.22% |
| Water | 81.11% |

EXAMPLE 14

| | |
|---|---|
| Tetra zinc hydroxide, tri(tetraboric acid) salt | 0.80% |
| Cupric hydroxide | 0.34% |
| Aqueous sodium silicate (48%) | 13.27% |
| Aqueous ammonia (25%) | 3.26% |
| Ethylenediamine | 1.22% |
| Water | 81.11% |

EXAMPLE 15

| | |
|---|---|
| Tetra zinc hydroxide, tri(tetraboric acid) salt | 1.92% |
| Cupric hydroxide | 0.82% |
| Aqueous sodium silicate (48%) | 31.88% |
| Aqueous ammonia (25%) | 7.84% |
| Ethylenediamine | 2.93% |
| Water | 54.61% |

EXAMPLE 16

| | |
|---|---|
| Tetra zinc hydroxide, tri(tetraboric acid) salt | 0.48% |
| Cupric hydroxide | 0.21% |
| Aqueous sodium silicate (48%) | 7.97% |
| Aqueous ammonia (25%) | 1.96% |
| Ethylenediamine | 0.74% |
| Water | 88.64% |

EXAMPLE 17

| | |
|---|---|
| Copper tetraborate | 0.57% |
| Aqueous sodium silicate (48%) | 10.42% |
| Aqueous ammonia (25%) | 5.20% |
| Water | 83.81% |

EXAMPLE 18

| | |
|---|---|
| Copper tetraborate tribasic | 0.34% |
| Aqueous sodium silicate (48%) | 10.42% |
| Aqueous ammonia (25%) | 5.20% |
| Water | 84.04% |

EXAMPLE 19

| | |
|---|---|
| Copper tetraborate tribasic | 0.34% |
| Aqueous sodium silicate (48%) | 10.42% |
| Aqueous ammonia (25%) | 5.20% |
| Water | 84.04% |

EXAMPLE 20

| | |
|---|---|
| Copper tetraborate tribasic | 0.35% |
| Zinc oxide | 0.31% |
| Aqueous sodium silicate (48%) | 35.60% |
| Aqueous ammonia (25%) | 3.38% |
| Ethylenediamine | 3.38% |
| Water | 56.98% |

EXAMPLE 21

| | |
|---|---|
| Tetra zinc hydroxide, tri(tetraboric acid) salt | 1.64% |
| Aqueous sodium silicate (48%) | 16.40% |
| Aqueous ammonia (25%) | 4.92% |
| Ethylenediamine | 4.92% |
| Water | 72.12% |

EXAMPLE 22

| | |
|---|---|
| Tetra zinc hydroxide, tri(tetraboric acid) salt | 0.82% |
| Basic copper carbonate | 0.31% |
| Aqueous sodium silicate (48%) | 35.60% |
| Aqueous ammonia (25%) | 3.38% |
| Ethylenediamine | 3.38% |
| Water | 56.51% |

EXAMPLE 23

| | |
|---|---|
| Borax | 2.64% |
| Cupric hydroxide | 0.43% |
| Aqueous sodium silicate (48%) | 17.06% |
| Aqueous ammonia (25%) | 1.11% |
| Ethylenediamine | 0.33% |
| Water | 78.43% |

EXAMPLE 24

| | |
|---|---|
| Boric acid | 1.71% |
| Cupric hydroxide | 0.43% |
| Aqueous sodium silicate (48%) | 17.06% |
| Aqueous ammonia (25%) | 1.11% |
| Ethylenediamine | 0.33% |

-continued

| Water | 79.36% |
|---|---|

EXAMPLE 25

| Boric acid | 1.71% |
|---|---|
| Copper sulfate | 0.83% |
| Aqueous sodium silicate (48%) | 17.06% |
| Ethylenediamine | 1.00% |
| Water | 79.40% |

It should be noted that the cuptic hydroxide in EXAMPLES 2, 3, 5 to 16, 23 and 24 contains 48.8 percent of copper; the zinc oxide in EXAMPLE 20 contains 80.3 percent of zinc; the basic copper carbonate in EXAMPLES 1 and 22 contains 56.4 percent of copper; and the copper sulfate pentahydrate in EXAMPLE 25 contains 25.5 percent of copper.

The aqueous ammonia, and ethylene diamine serve not only as an assistant for making zinc borate, copper hydroxide and sodium silicate more soluble in water, but also as a stabilizer for stably keeping these compounds dissolved in water.

Next, a first treatment was carried out in which woods were immersed in the respective first impregnation solutions that is, EXAMPLE 1 to 25 solutions.

Specifically, each first impregnation solution was filled in a water-tight closed chamber. A sapwood piece of Japanese red pine of 1×2×5 cm in size was placed in each solution filled in the chamber. Each sapwood piece was first impregnated with each first solution by holding it in each solution for 30 minutes at a reduced chamber pressure of 700 mmHg. Thereafter the sapwood pieces for EXAMPLES 1, 2, 12 to 22 were kept in their respective solutions for minutes at normal chamber pressure. The sapwood pieces for EXAMPLES 5 to 11 were kept in their respective solutions for 24 hours at normal chamber pressure.

The impregnated sapwood pieces for EXAMPLES 5 to 25 were placed under a forcible removal process to remove the volatile basic compound and water. Specifically, each of the impregnated sapwood pieces were placed in a chamber whose pressure was reduced to 700 mmHg. The sapwood pieces for EXAMPLES volatile basic compound and water. impregnated sapwood pieces were placed in a chamber whose pressure was reduced to 700 mmHg. The sapwood pieces for EXAMPLES 5 to 10, and 12 to 16 were kept in the reduced pressure chamber for 30 minutes. The sapwood pieces for EXAMPLES 17 to 21 were kept in the reduced pressure chamber for 4 hours. The sapwood pieces for EXAMPLES 23 to 25 were kept in the reduced pressure chamber for 1 hour. The sapwood piece for EXAMPLE 22 was kept in the reduced pressure chamber for 3.5 hours. The sapwood piece for EXAMPLE 11 was air-dried at normal pressure for 2 days.

The above-mentioned first treatment conditions are shown in the following TABLE-1. In TABLE-1, the impregnated amount means the amount of first solution which was impregnated in each sapwood piece. The removal amount means the amount of first solution which was removed from each impregnated sapwood.

TABLE 1

| EXAMPLE NO. | IMPREGNATION | | | AFTER TREATMENT | |
|---|---|---|---|---|---|
| | REDUCED PRESSURE | NORMAL PRESSURE | IMPREGNATED AMOUNT (KG/M$^3$) | FORCIBLE REMOVAL | REMOVAL AMOUNT (KG/M$^3$) |
| 1 | 30 min. | 30 min. | 652 | none | none |
| 2 | 30 min. | 30 min. | 700 | none | none |
| 3 | 30 min. | 15 hr. | 625 | none | none |
| 4 | 30 min. | 15 hr. | 643 | none | none |
| 5 | 30 min. | 24 hr. | 665 | 30 min. | 32 |
| 6 | 30 min. | 24 hr. | 665 | 30 min. | 34 |
| 7 | 30 min. | 24 hr. | 665 | 30 min. | 38 |
| 8 | 30 min. | 24 hr. | 669 | 30 min. | 31 |
| 9 | 30 min. | 24 hr. | 666 | 30 min. | 30 |
| 10 | 30 min. | 24 hr. | 668 | 30 min. | 34 |
| 11 | 30 min. | 24 hr. | 695 | air-dry | 50 |
| 12 | 30 min. | 30 min. | 665 | 30 min. | 35 |
| 13 | 30 min. | 30 min. | 668 | 30 min. | 32 |
| 14 | 30 min. | 30 min. | 676 | 30 min. | 48 |
| 15 | 30 min. | 30 min. | 713 | 30 min. | 36 |
| 16 | 30 min. | 30 min. | 610 | 30 min. | 31 |
| 17 | 30 min. | 30 min. | 667 | 4 hr. | 151 |
| 18 | 30 min. | 30 min. | 667 | 4 hr. | 155 |
| 19 | 30 min. | 30 min. | 666 | 4 hr. | 148 |
| 20 | 30 min. | 30 min. | 730 | 4 hr. | 145 |
| 21 | 30 min. | 30 min. | 730 | 4 hr. | 145 |
| 22 | 30 min. | 30 min. | 730 | 3.5 hr. | 145 |
| 23 | 30 min. | 24 hr. | 700 | 1 hr. | 35 |
| 24 | 30 min. | 24 hr. | 700 | 1 hr. | 35 |
| 25 | 30 min. | 24 hr. | 700 | 1 hr. | 35 |

A second treatment was carried out in which the sapwoods for EXAMPLES 4 to 25 treated in the first treatment were impregnated with a second impregnation solution in which rare earth chloride or alkaline earth chloride was dissolved. Specifically, the following second impregnation solutions were prepared for EXAMPLES 4 to 25.

EXAMPLE 4

| Cerium chloride (III) | 2.0% |
|---|---|
| Ethylene glycol | 2.0% |
| Water | 96.0% |

EXAMPLE 5

| Cerium chloride (III) | 7.7% |
|---|---|
| Water | 92.3% |

EXAMPLE 6

| Cerium chloride (III) | 7.7% |
|---|---|
| Water | 92.3% |

EXAMPLE 7

| Cerium chloride (III) | 7.7% |
|---|---|
| Water | 92.3% |

EXAMPLE 8

| Cerium chloride (III) | 7.7% |
|---|---|
| Water | 92.3% |

EXAMPLE 9

| Cerium chloride (III) | 7.7% |
|---|---|
| Water | 92.3% |

EXAMPLE 10

| Cerium chloride (III) | 7.7% |
|---|---|
| Water | 92.3% |

EXAMPLE 11

| Cerium chloride (III) | 22.1% |
|---|---|
| Water | 77.9% |

EXAMPLE 12

| Cerium chloride (III) | 5.0% |
|---|---|
| Calcium chloride | 3.0% |
| Water | 92.0% |

EXAMPLE 13

| Cerium chloride (III) | 22.1% |
|---|---|
| Water | 77.9% |

EXAMPLE 14

| Magnesium chloride | 7.7% |
|---|---|
| Water | 92.3% |

EXAMPLE 15

| Cerium chloride (III) | 18.2% |
|---|---|
| Water | 81.8% |

EXAMPLE 16

| Cerium chloride (III) | 4.6% |
|---|---|
| Water | 95.4% |

EXAMPLE 17

| Cerium chloride (III) | 23.9% |
|---|---|
| Water | 76.1% |

EXAMPLE 18

| Cerium chloride (III) | 23.9% |
|---|---|
| Water | 76.1% |

EXAMPLE 19

| Magnesium chloride | 12.0% |
|---|---|
| Water | 88.0% |

EXAMPLE 20

| Cerium chloride (III) | 10.0% |
|---|---|
| Water | 90.0% |

EXAMPLE 21

| Cerium chloride (III) | 8.0% |
|---|---|
| Water | 92.0% |

EXAMPLE 22

| Magnesium sulfate | 39.8% |
|---|---|
| Water | 60.2% |

EXAMPLE 23

| Cerium chloride (III) | 2.0% |
|---|---|
| Ethylene glycol | 2.0% |
| Water | 96.0% |

EXAMPLE 24

| Cerium chloride (III) | 2.0% |
|---|---|
| Ethylene glycol | 2.0% |
| Water | 96.0% |

EXAMPLE 25

| Cerium chloride (III) | 2.0% |
|---|---|
| Ethylene glycol | 2.0% |
| Water | 96.0% |

The cerium chloride (III) is produced and sold by Shin-nippon Kinzokukagaku Kabushiki Kaisha, a Japanese company, and has 68.9 percent of lanthanoid chloride. More specifically, the cerium chloride (III) contains lanthanoid chlorides and water as follows:

| Cerium chloride | 35.5% |
|---|---|
| Lanthanum chloride | 18.2% |
| Neodymium chloride | 11.2% |
| Praseodymium chloride | 3.5% |
| Samarium chloride | 0.5% |
| Water | 31.1% |

The magnesium chloride and magnesium sulfate are 1.00 percent pure.

The sapwood pieces for EXAMPLES 13, 17 to 22 were impregnated with their respective second solution by holding it in each solution for 30 minutes at a reduced chamber pressure of 700 mm Hg. The other sapwood pieces were not applied to the reduced pressure impregnation.

The sapwood pieces were impregnated with their respective second solutions at normal pressure under the following conditions:

EXAMPLE 4, at 60° C. for 5 days;
EXAMPLE 5, at normal temperature for 3 days;
EXAMPLE 6, at normal temperature for 5 days;
EXAMPLE 7, at normal temperature for 10 days.;
EXAMPLE 8, at 40° C. for 4 days;
EXAMPLE 9, at 60° C. for 1 days;
EXAMPLE 10, at 60° C. for 4 days;
EXAMPLE 12, at normal temperature for 7 days:
EXAMPLE 13, at 60° C. for 6 days;
EXAMPLE 14, at 40° C. for 4 days;
EXAMPLE 15, at normal temperature for 8 days;
EXAMPLE 16, at normal temperature for 8 days;
EXAMPLE 17, at normal temperature for 30 min.;
EXAMPLE 18, at normal temperature for 30 min.;
EXAMPLE 19, at normal temperature for 30 min.;
EXAMPLE 20, at normal temperature for 30 min.;
EXAMPLE 21, at normal temperature for 30 min.;
EXAMPLE 22, at normal temperature for 60° C. min.;
EXAMPLE 23, at 60° C. for 5 days;
EXAMPLE 24, at 60° C. for 5 days; and
EXAMPLE 25, at 60° C. for 5 day.

However, the sapwood piece for EXAMPLE 11 was impregnated with the second solution by holding it in the reduced pressure chamber for 60° C. minutes.

The above-mentioned second treatment conditions are shown in TABLE-2.

TABLE 2

| | IMPREGNATION | |
|---|---|---|
| EXAMPLE NO. | REDUCED PRESSURE | NORMAL PRESSURE |
| 1 | none | none |
| 2 | none | none |
| 3 | none | none |
| 4 | none | 60° C., 5 days |
| 5 | none | normal temperature, 3 days |
| 6 | none | normal temperature, 5 days |
| 7 | none | normal temperature, 10 days |
| 8 | none | 40° C., 4 days |
| 9 | none | 60° C., 1 day |
| 10 | none | 60° C., 4 days |
| 11 | 30 min. | normal temperature, reduced pressure, 60 min. |
| 12 | none | normal temperature, 7 days |
| 13 | none | 60° C., 6 days |
| 14 | none | 40° C., 4 days |
| 15 | none | normal temperature, 8 days |
| 16 | none | normal temperature, 8 days |
| 17 | 30 min. | normal temperature, 30 min. |
| 18 | 30 min. | normal temperature, 30 min. |
| 19 | 30 min. | normal temperature, 30 min. |
| 20 | 30 min. | normal temperature, 30 min. |
| 21 | 30 min. | normal temperature, 30 min. |
| 22 | 30 min. | normal temperature, 60 min. |
| 23 | none | 60° C., 5 days |
| 24 | none | 60° C., 5 days |
| 25 | none | 60° C., 5 days |

Finally, a test was conducted for each impregnated sapwood piece to examine the leaching rate. This test was carried out in accordance with the following accelerated field leaching test.

The sapwood pieces finished with the second treatment were air-dried at room temperature for 2 days dried in drier held at 60° C. for 2 days, and immersed in hot water heated at 60° C. for 10 days. The amount of boric acid. copper and zinc leached in the hot water were measured.

Concerning the leaching of boric acid and the like impregnated into the wood, it is a new knowledge obtained by studying the result of the underground laying test B. R. Johnson conducted by burying pile impregnated with copper borate in the field for 2 years, that the immersion of wood in hot water of 60° C. for 10 days is equivalent to that of the wood buried in the earth for 2 years. Specifically, B. R. Johnson buried the pile impregnated with copper borate in the earth for 2 years and disclosed analytical values of copper and boric acid still remaining in the pile after 2 years (P59 to P63, "Forest product Journal" Vol. 33, No. 9, 1983).

The inventors impregnated copper borate similar to the above into a wood piece, immersed the same in hot water of 60° C. for 10 days, and obtained leached amounts of copper and boric acid by analyzing the water. Remaining rates of copper and boric acid in the wood piece corresponded in the test result of B. R. Johnson and that of the inventors. Therefore, the above accelerated field leaching test was employed on the belief that this is equivalent to the field underground laying test for 2 years. By carrying out this accelerated leaching test, the state of leaching can be approximated to in the case where the wood is laid in the earth. The test results are shown in TABLE-3.

TABLE 3

| EXAMPLE NO. | LEACHING RATE (WT %) | | | FIXING RATE (WT %) | | |
|---|---|---|---|---|---|---|
| | $H_3BO_3$ | Cu | Zn | $H_3BO_3$ | Cu | Zn |
| 1 | 80.6 | 27.1 | 56.2 | 19.4 | 72.9 | 43.8 |
| 2 | 97.7 | 17.8 | — | 2.3 | 82.2 | — |
| 3 | 100 | 7.7 | 3.1 | 0 | 92.3 | 96.9 |
| 4 | 100 | 3.3 | — | 0 | 96.7 | — |
| 5 | 68.1 | 6.4 | 1.1 | 31.9 | 93.6 | 98.9 |
| 6 | 58.3 | 8.0 | 2.1 | 41.7 | 92.0 | 97.9 |
| 7 | 44.6 | 25.3 | 10.2 | 55.4 | 74.7 | 89.8 |
| 8 | 39.7 | 12.7 | 2.6 | 60.3 | 87.3 | 97.4 |
| 9 | 61.1 | 5.2 | 0.6 | 38.9 | 94.8 | 99.4 |
| 10 | 32.7 | 12.6 | 4.5 | 67.3 | 87.4 | 95.5 |
| 11 | 43.7 | 16.6 | 1.7 | 56.3 | 83.4 | 98.3 |
| 12 | 50.0 | 13.0 | 5.0 | 50.0 | 87.0 | 95.0 |
| 13 | 22.0 | 18.0 | 7.0 | 78.0 | 82.0 | 93.0 |
| 14 | 38.0 | 11.0 | 3.0 | 62.0 | 89.0 | 97.0 |
| 15 | 48.0 | 17.0 | 6.0 | 52.0 | 83.0 | 94.0 |
| 16 | 49.0 | 15.0 | 6.5 | 51.0 | 85.0 | 93.5 |
| 17 | 15.2 | 13.0 | — | 84.8 | 87.0 | — |
| 18 | 2.9 | 0.2 | — | 97.1 | 99.8 | — |
| 19 | 5.0 | 5.1 | — | 95.0 | 94.9 | — |
| 20 | 31.0 | 8.5 | 2.0 | 69.0 | 91.5 | 98.0 |
| 21 | 15.0 | — | 0.5 | 67.0 | — | 99.5 |
| 22 | 37.8 | 4.5 | 0.7 | 62.2 | 95.5 | 99.3 |
| 23 | 50.2 | 3.6 | — | 49.8 | 96.4 | — |
| 24 | 45.5 | 3.9 | — | 54.5 | 96.1 | — |
| 25 | 45.0 | 5.0 | — | 55.0 | 95.0 | — |

Figure 1:
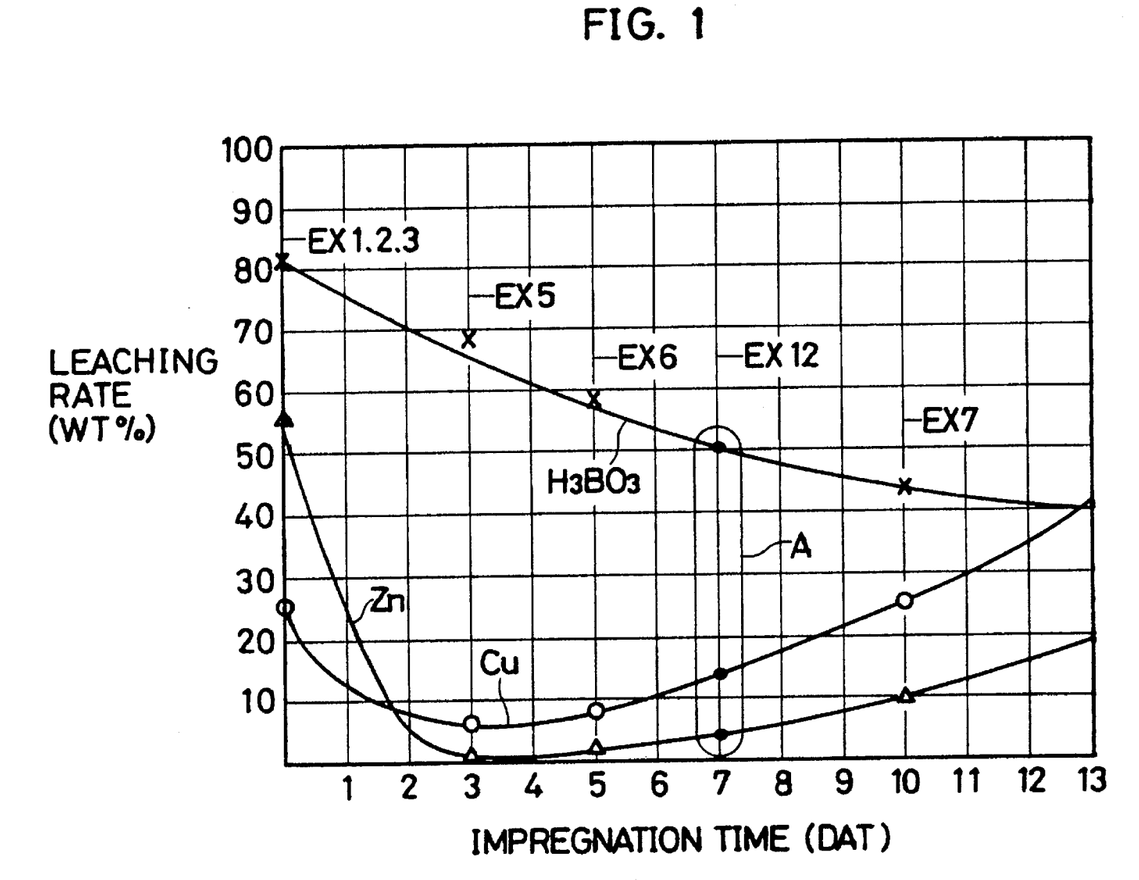
FIG. 1 is a graph showing a relationship between an immersion time (days) during which wood is immersed in solution at a normal pressure and a normal temperature in a second treatment and test results (leaching rate) of an accelerated leaching test, wherein a horizontal axis represents the immersion time during which the wood is immersed in the second solution and a vertical axis represents a leaching rate.
Figure 2:
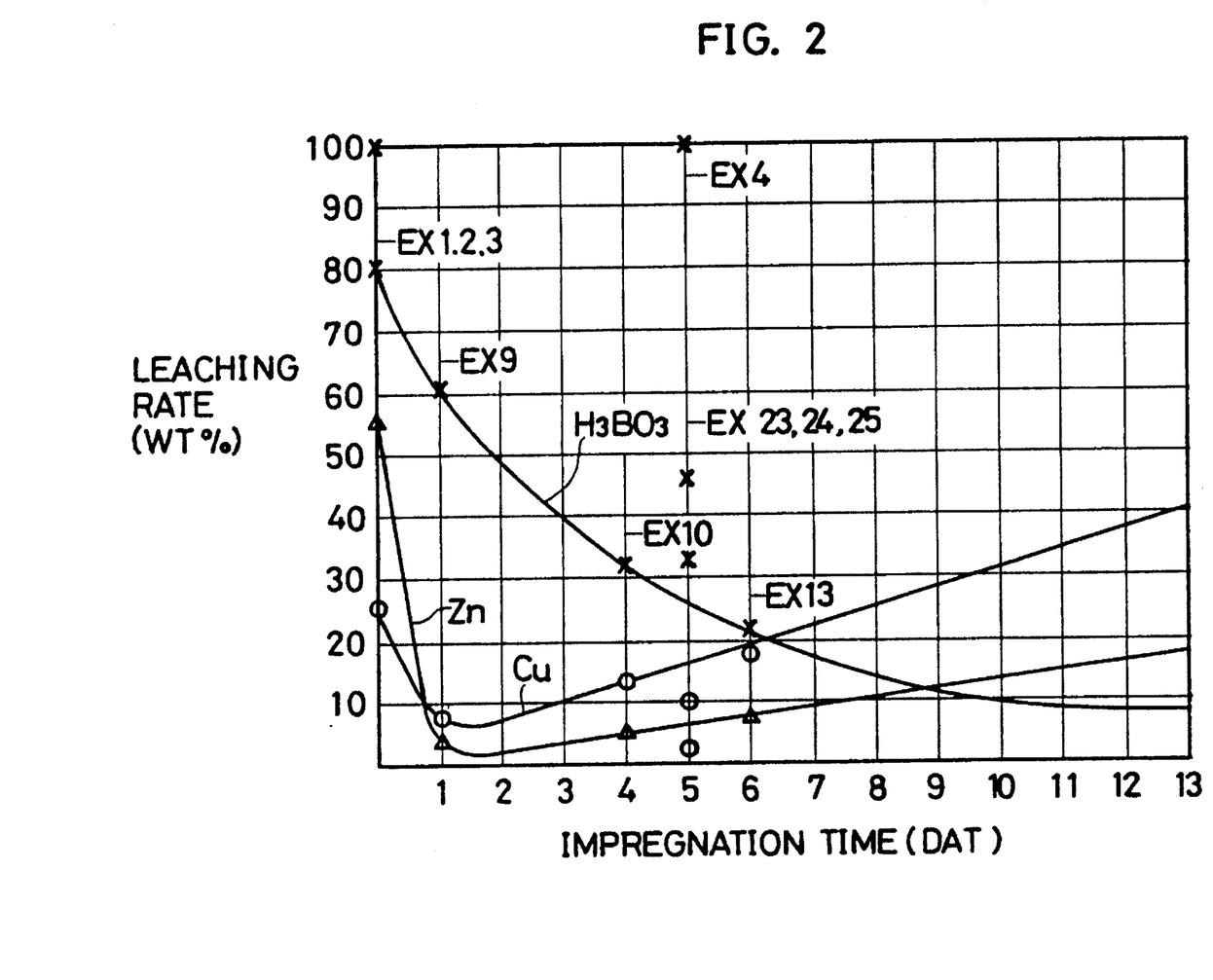
FIG. 2 is a graph showing a relationship between an immersion time (days) during which wood is immersed in solution at a normal pressure in the second treatment and the test results (leaching rate) of the accelerated leaching test, wherein a horizontal axis represents the immersion time during Which the wood is immersed in the second solution and a vertical axis represents a leaching rate.

FIG. 1 is a graph showing a relationship between an immers ion time (days) during which wood is immersed in the second treatment solution at normal pressure and normal temperature during the second treatment and the test results (leaching rate) of the accelerated leaching test oil the basis of the test results shown in TABLE-3, wherein a horizontal axis represents the immersion time during which the wood is immersed in the second solution and a vertical axis represents the leaching rate. FIG. 2 is a graph similar to the one shown in FIG. 1 except for that the second treatment is conducted at a temperature of 60° C.

As seen from FIGS. 1 and 2 EXAMPLES 1 and 2, in which sodium silicate was not added in the first solution and the second treatment was not applied, shows high leaching rates of boric acid, zinc and copper. Specifically, the leaching rate of boric acid is 80.6 percent in EXAMPLE 1 and 97.7 percent in EXAMPLE 2; the leaching rate of copper is 27.1 percent in EXAMPLE 1 and 17.8 percent in EXAMPLE 2; the leaching rate of zinc is 56.2 percent in EXAMPLE 1.

EXAMPLE 3. in which sodium silicate was added in the first solution but the second treatment was not applied. shows high leaching rates of boric acid. However, leaching rates of copper and zinc are noticeably lower than those in EXAMPLES 1 and 2 in which sodium silicate was not added and the second treatment was not applied. Specifically, the leaching rate of boric acid is 100 weight percent while the leaching rate of copper is 7.7 weight percent and the leaching rate of zinc is 3.1 weight percent. In EXAMPLE 1, the leaching rates of copper and zinc are 27.1 weight percent and 56.2 weight percent. In EXAMPLE 2, also, the leaching rate of copper is 17.8 weight percent. From this fact, it will be seen that the addition of sodium silicate was not effective to fix boric acid, but increased the fixing rate of metallic components or copper and zinc.

Also, EXAMPLE 4, in which sodium silicate was not added in the first solution but the second treatment was applied, shows high leaching rates of boric acid. However, the leaching rate of copper is noticeably lower than those in EXAMPLES 1 and 2 in which the second treatment was not applied. Specifically, the leaching rate of boric acid is 100 weight percent. On the other hand, the leaching rate of copper is 3.3 weight percent in EXAMPLE 4. In EXAMPLES 1 and 2, the respective leaching rates of copper are 27.1 weight percent and 17.8 weight percent. From this fact, it will be seen that the second treatment was effective in fixing boric acid, and increased the fixing rate of copper.

Further, from EXAMPLES 5 to 25 where sodium silicate was added in the first impregnation solution and the second treatment was applied, it will be seen that both the addition of sodium silicate in the first solution and application of the second treatment considerably improved the fixing rate of boric acid as well as that of copper and zinc. Specifically, the leaching rate of boric acid in EXAMPLES 5 to 25 is considerably lower than those in EXAMPLES 1 to 4. Also, similar to EXAMPLES 3 and 4, the leaching rate of copper and zinc is lower than those in EXAMPLES 1 and 2.

Also the leaching rate of boric acid decreases as the wood is immersed for a longer time. The leaching rate of boric acid is reduced to 44.6 percent in the case of the wood being immersed for 10 days, i.e., in EXAMPLE 7. Thus, boric acid is fixed in the wood at a fixing rate of about 55.4 percent.

The leaching rate of zinc which is 56.2 percent in EXAMPLE 1, is reduced to 1.1 percent in the case of the wood being immersed for 3 days i.e. in EXAMPLE 5. However, the leaching rate of zinc gradually increases as the immersion time is longer.

The leaching rate of copper, which is 27.1 in EXAMPLE 1 and 17.8 percent in EXAMPLE 2, is reduced to 6.4 percent in the case of the wood being immersed for 3 days. i.e. in EXAMPLE 5. Similar to zinc the leaching rate of copper gradually increases as the immersion time increases.

It has not yet been confirmed why the leaching rate of copper and zinc increase after the immersion time of 3 days. However, it can be supposed that, when the wood is immersed too long rare earth chlorides. $CaCl_2$ and $MgCl_2$, penetrated into the colloidal gel of rare earth and alkaline earth silicates in the wood which are produced by the action of the rare earth and alkaline earth chlorides react with copper compound or zinc compound and are then leached in the form of $CuCl_2$ or $ZnCl_2$.

On an actual operation scale, it is proper to immerse the wood for 7 days when the leaching rate of boric acid becomes 50 percent as indicated at A in FIG. 1, so long as the second treatment is conducted at normal temperature. This is because the fixing rate of boric acid is poor when the immersion time is shorter than 7 days and because the fixing rates of copper and zinc becomes poor when the immersion time is longer than 7 days. When the immersion time in the second solution is set to 7 days the fixing rates of boric acid, copper and zinc satisfactorily become 50 percent, 87 percent and 95 percent, respectively.

In the graph of FIG. 2 showing the test results when the second treatment was conducted at 60° C., the leaching rate of boric acid is remarkably reduced. In EXAMPLE 13, the leaching rate of boric is reduced to 22.0 percent (about half of the leaching rate of boric acid in EXAMPLE 12 where the second treatment was conducted at normal temperature for 7 days. No remarkable difference is recognized in copper and zinc. The immersion time of 2 days is sufficient to make the leaching rate of boric acid 50 percent by conducting the treatment at 60° C. If a further reduction of the leaching rate of boric acid is desired the immersion time may be lengthened to attain a desired leaching rate with reference to FIG. 2.

As described above, copper, zinc, and boron compounds have high fungi and insect resisting effects, and sodium silicate has the effect of increasing the fixing rate. Further, these compounds have a high flame retarding effect. To show a flame retarding effect of an inventive wood preservative composition, a comparative test was executed. Specifically, a TEST PIECE I of 1×2×5 cm sapwood was prepare which has been treated with an inventive wood preservative composition containing tetra zinc hydroxide, tri(tetraboric acid) salt, copper hydroxide, and sodium silicate, and a TEST PIECE II of the same-size sapwood was prepared which had not been treated with any solution. These test pieces were placed in contact with a top portion of a flame of an experimental burner for a period of 1 minute. Thereafter, these test pieces were moved away from the burner flame and observed for the presence of flame, the presence of glow, and the length of a carbonized portion. TABLE-4 shows the results.

TABLE 4

|  | Flame | Glow | Carbonized length |
|---|---|---|---|
| PIECE I | none | none | 2.5 cm |
| PIECE II | 110 sec. | 330 sec. | 3.5 cm |

The treated TEST PIECE I did not have a flame or glow after being taken away from the burner while the non-treated TEST PIECE II had a flame for 110 seconds and glowed for 330 seconds. Also, the carbonized portion of the treated TEST PIECE I was 2.5 cm while that of the non-treated TEST PIECE II was 3.5 cm. From the results of the above comparative test, it will be seen that wood which is treated with an inventive composition has a high flame retarding effect in addition to the above-mentioned fungi and insect resisting effects. Accordingly wood treated with a composition of the present invention can be used as a flame retarded wood.

Further, added with sodium silicate and/or neutral salt is added to the composition of the present invention. Accordingly, the present inventive composition can keep the flame retarding effect for a longer time as well as the fungi and insect resisting effects.

From the above, it is seen that an inventive wood treating process is excellent according to which wood is immersed in a solution of the inventive wood preservative composition including a preservative compound and sodium silicate; or wood is alternatively immersed in a first solution including a preservative compound but no sodium silicate and then immersed in a second solution including a neutral salt: or wood is alternatively immersed in a first solution including a preservative compound and sodium silicate and then immersed in a second solution including a neutral salt.

Accordingly, in the wood treated with the inventive wood preservative composition according to the inventive process boric acid zinc or copper having a wood preserving action are satisfactorily retained by the action of sodium silicate which is a component of the first impregnation solution, and sodium silicate changes into water insoluble silicate by the action of the second impregnation solution penetrating into wood tissues. Therefore, even if the wood treated as above is laid in the earth over a long term, the effective components is held for a long time. The wood preserving action of the effective components prevents the wood from decomposing and being damaged by termites or like noxious insects.

As described above an inventive wood preservative composition having an improved fixing ability is obtained by dissolving a wood preservative compound, such as boric acid, zinc, and copper compound, and sodium silicate in a first basic aqueous solution. Any of these wood preservative compounds has a low toxicity to a human body, but a satisfactory wood preserving action. The impregnation of these compounds into wood gives the wood a wood preserving function, with the result that the wood is effectively prevented from being decomposed by noxious fungi and being damaged from noxious insects.

The wood impregnated with the first solution is further immersed in a second solution containing a neutral salt, such as rare earth chloride, and alkaline earth chloride. The neutral salt makes the sodium silicate in the first solution a water insoluble fine colloid, which enables the silicate to enter tinier ducts in the wood to close up these ducts. As a result, an overall blocking effect is improved. Therefore, when the wood preservative component flows in the impregnated wood, the water insoluble effective component will allow a large wood preserving action to fix more stably in the wood. As a result, the leaching of the wood preservative component out of the wood can be effectively prevented.

Also, even if wood is immersed in a first solution containing a preservative copper or zinc compound but not containing sodium silicate, the leaching rate of copper and zinc components can be reduced by immersing the wood in the second solution containing neutral salt.

Further in the case of wood being immersed in a first solution containing a preservative copper or zinc compound and sodium silicate, the leaching rate of copper and zinc components can be reduced even if not being immersed in the second solution containing neutral salt.

According to an inventive wood treating process, wood is impregnated with the inventive wood preservative composition obtained by dissolving the effective component and sodium silicate in a basic aqueous solution, and thus impregnated wood is further impregnated with an aqueous solution containing either one or both of rare earth chloride and alkaline earth chloride. It is realized by the presence of this neutral salt compound to make sodium silicate in the composition a water insoluble fine colloid, which enables silicate to enter tinier ducts in the wood to close up these ducts. As a result, an overall blocking effect is improved. Thus, a greater amount of composition can be retained in the wood while the leaching thereof out of the wood is prevented.

The wood treated with the inventive process is impregnated with the wood preservative composition obtained by dissolving the effective component and sodium silicate in a basic aqueous solution, and with either one or both of rare earth chloride and alkaline earth chloride. Accordingly, the effective component having a wood preserving action is fixed in the wood by being closed up by the gelatinized water insoluble silicate. Therefore, even if this wood is exposed to the air or laid in the earth over a long term, the composition is confined in the wood by the gelatinized water insoluble silicate and is unlikely to leach out of the wood. Thus, the wood impregnated with the composition can be preserved over a long term.

Also, wood impregnated with a solution containing the above-mentioned copper, zinc, or boron compound has a high flame retarding effect.

What is claimed is:

1. A wood preservative composition comprising:
   a preservative component selected from the group consisting of copper compound, zinc compound, boron compound, and mixtures thereof, said preservative component being present in an amount of 0.1 to 10 wt. %;

water;

a volatile basic compound, said volatile basic compound having the formula $R_3N$, R being selected from the group consisting of a hydrogen atom and a lower alkyl group, said volatile basic compound being present in an amount effective to dissolve the preservative component in water;

sodium silicate, said sodium silicate being present in an amount of 0.1 to 50 wt. %; and an aqueous solution including neutral salt, said neutral salt being at least one compound selected from the group consisting of a rare earth chloride and an alkaline earth salt, and said neutral salt being present in an amount of 1 to 50 wt. %.

2. A wood preservative composition according to claim 1 wherein the copper compound is selected from the group consisting of copper borate, copper hydroxide, copper acetate, copper chloride, and copper sulfate.

3. A wood preservative composition according to claim 2 wherein the copper borate is selected from the group consisting of copper tetraborate, copper tetraborate monobasic, copper tetraborate dibasic, and copper tetraborate tribasic.

4. A wood preservative composition according to claim 1 wherein the zinc compound is selected from the group consisting of zinc borate, zinc acetate, zinc hydroxide, zinc oxide, zinc chloride, zinc sulfate.

5. A wood preservative composition according to claim 4 wherein the zinc borate is selected from the group consisting of zinc tetraborate, zinc tetraborate dibasic, tetra zinc hydroxide tri(tetraboric acid) salt, and zinc hydroxide dimetaboric acid salt.

6. A wood preservative composition according to claim 5 wherein the boron compound is selected from the group consisting of boric acid and borax.

7. A wood preservative composition according to claim 1 wherein the rare earth chloride is selected from the group consisting of scandium chloride, yttrium chloride, and lanthanoid chloride.

8. A wood preservative composition according to claim 1 wherein the alkaline earth salt is selected from the group consisting of calcium chloride, magnesium chloride, barium chloride, strontium chloride, and magnesium sulfate.

9. A process for treating wood comprising the steps of:
   impregnating wood with a solution including:

a preservative component selected from the group consisting of copper compound, zinc compound, boron compound, and mixtures thereof, said preservative component being present in an amount of 0.1 to 10 wt. %;

water;

a volatile basic compound, said volatile basic compound having the formula $R_3N$, R being selected from the group consisting of a hydrogen atom and a lower alkyl group, said volatile basic compound being present in an amount effective to dissolve the preservative component in water;

sodium silicate, said sodium silicate being present in an amount of 0.1 to 50 wt. %; and impregnating the wood impregnated with the solution with another solution including a neutral salt, said neutral salt being at least one compound selected from the group consisting of a rare earth chloride and an alkaline earth salt.

10. A wood preservative composition comprising:
    a preservative component selected from the group consisting of copper compound, zinc compound, boron compound, and mixtures thereof, said preservative component being present in an amount of 0.1 to 10 wt. %;

water;

a volatile basic compound, said volatile basic compound having the formula $R_3N$, R being selected from the group consisting of a hydrogen atom and a lower alkyl group, said volatile basic compound being present in an amount effective to dissolve the preservative component in water; and a neutral salt, said neutral salt being present in an amount of 0.1 to 50 wt. %

11. A wood preservative composition according to claim 10, wherein said neutral salt is a compound selected from the group consisting of a rare earth chloride and an alkaline earth salt.

12. A wood preservative composition according to claim 10 further comprising 0.1 to 50 wt. % sodium silicate.

* * * * *